(12) United States Patent
von Mayenburg et al.

(10) Patent No.: US 6,240,339 B1
(45) Date of Patent: May 29, 2001

(54) VEHICLE REAR AXLE LOAD RELIEF METHOD AND SYSTEM

(75) Inventors: Michael von Mayenburg; Gary W. Rossow, both of Lake Oswego; Cary Coverdill, Boring, all of OR (US); Judith Estep, Vancouver, WA (US); Doug Loutzenheiser, Lake Oswego, OR (US); Long V. Nguyen, Oregon City, OR (US); James Tipka, West Linn, OR (US)

(73) Assignee: Freightliner LLC, Portland, OR (US)

( * ) Notice: Subject to any disclaimer, the term of this patent is extended or adjusted under 35 U.S.C. 154(b) by 0 days.

(21) Appl. No.: 09/259,154

(22) Filed: Feb. 26, 1999

(51) Int. Cl.[7] .............................. G06F 17/00; G06F 7/00
(52) U.S. Cl. ................. 701/1; 701/69; 701/72; 701/79; 280/405.1; 280/407.1; 303/123
(58) Field of Search ................. 701/1, 7, 69, 72, 701/79, 93; 280/407.1, 405.1, 423.1, 425.1, 476.1; 303/123

(56) References Cited

U.S. PATENT DOCUMENTS

| | | | |
|---|---|---|---|
| 3,738,680 | 6/1973 | Pollinger et al. | 267/64.16 |
| 4,383,696 | 5/1983 | Picard | 280/81.1 |
| 4,398,738 | 8/1983 | McDaniel | 280/81.1 |
| 4,462,477 | 7/1984 | Mastro | 180/24.02 |
| 4,616,726 | 10/1986 | Johansson | 180/419 |
| 4,854,409 | 8/1989 | Hillebrand et al. | 180/24.02 |
| 4,856,814 | 8/1989 | Jones | 280/86.5 |
| 5,033,798 | * 7/1991 | Breen | 303/7 |
| 5,035,439 | 7/1991 | Petrillo | 280/81.6 |
| 5,152,544 | * 10/1992 | Dierker et al. | 280/432 |
| 5,390,945 | 2/1995 | Orr | 280/81.5 |
| 5,494,309 | * 2/1996 | Roy | 280/401 |
| 5,526,890 | 6/1996 | Kadowaki | 180/8.3 |

* cited by examiner

Primary Examiner—William A. Cuchlinski, Jr.
Assistant Examiner—Gertrude Arthur
(74) Attorney, Agent, or Firm—Klarquist Sparkman Campbell Leigh & Whinston LLP

(57) ABSTRACT

A method and apparatus involves selectively relieving the load from the rearmost wheels of a trailer to shorten the effective wheel base of the trailer. When the effective wheel base is shortened, off-tracking of the trailer during turning is reduced. The load may relieved while the trailer and vehicle are traveling at, for example, less than a first speed, with the vehicle turning at least at a first angle. The axle may be reloaded when the vehicle speed is increased to a second speed above the first speed and the vehicle is turning at an angle which is less than the first angle.

40 Claims, 4 Drawing Sheets

VEHICLE REAR AXLE LOAD RELIEF METHOD AND SYSTEM

BACKGROUND

The present invention relates to selectively relieving the load on a rear axle of a vehicle, such as the rearmost axle of a trailer having at least two rear axles.

In a truck-trailer combination, the wheel base of a trailer having a single rear axle may be defined to be the distance from the pivot or king pin, where the trailer is pivoted to a vehicle, to the rear load-bearing axle of the trailer. In the case of a trailer having at least two rear load-bearing axles, the wheel base may be defined to be the distance from the king pin to the centroid of such plurality of axles. It is common for trailers to have relatively large wheel bases. When a truck-trailer combination is turned, for example, at an intersection, the rear of the trailer tends to follow a path which is inside the path followed by the vehicle during the turn rather than following the precise path of the vehicle. This is known as "off-tracking". The offset between the vehicle and trailer travel paths through a turn is greater for trailers with larger wheel bases in comparison to trailers with relatively smaller wheel bases. Also, off-tracking tends to be greater when a vehicle-trailer combination is making sharp turns in comparison to wider turns. Thus, in tight turns, such as at city intersections, the "off-tracking" trailer may be offset enough to impact street curbs or other objects at intersection corners.

It would be desirable to compensate or minimize this offset during selected vehicle operating conditions. It would particularly be useful to reduce off-tracking without requiring the vehicle to stop.

SUMMARY

In accordance with one aspect of a specific embodiment, the rearmost load-bearing location at which a trailer is supported may be shifted forwardly to thereby shorten the effective wheel base of the trailer and reduce off-tracking. This may be accomplished under selected conditions, such as when the vehicle is moving and turning.

As another aspect of an embodiment, the trailer may have at least two rear wheel supporting axles, one of the two rear wheel supporting axles being a rearmost axle. The speed of the vehicle may be determined and a determination may be made as to whether the vehicle is turning. In addition, the load on the rearmost axle may be relieved to shorten the trailer wheel base when the speed of the vehicle is determined to be no greater than a first speed and the vehicle is determined to be turning at least at a first angle. The first speed, the first angle, or both, may be predetermined and may be variable. For example, they may comprise software programmable variable values.

In one specific example, the load on the rearmost axle may be relieved by elevating the rearmost axle to lift the wheel supported by the rearmost axle. For example, the rearmost axle may be lifted sufficiently for the wheels to clear the roadway or a lesser extent so the wheels drag lightly on the roadway, in which case the wheels will provide little, if any, support to the trailer. Alternatively, the rear axles may be supported by an air bag suspension system with pressure in the system being varied, such as relieved, to thereby relieve the load carried by the rearmost axle. In this latter case, the wheels typically would remain in contact with the roadway, although they provide little, if any, support to the trailer.

The above steps may be accomplished automatically whenever selected conditions are determined to exist, without driver intervention. Alternatively, semi-automatic operation may be implemented, for example, requiring a driver to intervene (such as by activating a switch) in order for the load on the rearmost axle to be relieved.

Thereafter, the load on the rearmost axle may be selectively increased. For example, the load on this axle may be increased when the speed of the vehicle is determined to be at least at a second speed which is greater than the first speed and the vehicle is determined to be turning at a second angle which is less than the first angle. In other words, after a vehicle has turned a corner and again increased its speed the rearmost axle may again be shifted to a load supporting mode of operation. This shifting is preferably automatic if the prescribed conditions are met, although a less preferred semi-automatic operation may be implemented. Also, as an alternative, once the conditions are met for relieving the load on the rearmost axle, the rearmost axle may be automatically reloaded after a period of time. Although this may be varied, thirty seconds would be a specific example. As another option, the vehicle operator may activate an over-ride to prevent reloading of the axle, for example, while the vehicle is still turning, even though this time period has elapsed.

As a specific example, the first speed may be predetermined and between ten and fifteen miles per hour (although it may be more or less), and the second speed may be predetermined and may be at least at, for example, twenty-five miles per hour (although it may be more or less). As another specific example, the first predetermined angle may be five degrees (although this may vary), and the second predetermined angle may be a straight line (although this may vary), that is, corresponding to the vehicle traveling forwardly without turning.

In addition, the step of increasing the load on the rearmost axle may be delayed until such time as the speed of the vehicle is determined to be at least at the second speed for a predetermined period of time, such as thirty seconds. This period of time may be varied, and may be a software programmable variable.

In a specific approach, an air bag suspension system may be vented to relieve the load on the rearmost axle. Venting may then be ceased or interrupted when it is again desired to increase the load on the rearmost axle.

In addition, a vehicle operator actuated over-ride may be monitored along with monitoring whether a parking brake for the vehicle is engaged. In this case, the load on the rearmost axle may be relieved, for example, automatically, when the speed of the vehicle is no greater than a first speed and the vehicle is turning at least at a first angle, unless the parking brake of the vehicle is engaged or the over-ride is activated or set. In addition, relieving of the load may be blocked, for example, regardless of vehicle conditions when the vehicle operator actuated over-ride is activated. In addition, the load may be relieved in response to a vehicle operated actuated action or instruction, for example, in the event the vehicle is traveling at a speed which is no greater than the first speed and regardless of whether the vehicle is determined to be turning. In this latter case, the system may decline to relieve the load in response to the operator actuated instruction if other conditions exist, for example, the parking brake is engaged.

The system may include a processor coupled to a speed sensor and to a turn detector so as to receive speed signals and turn signals corresponding to the speed and turning of the vehicle. The processor may be responsive to the speed signals and turn signals to selectively cause the delivery of a relieve axle load signal to a suspension controller in the event certain conditions are met. For example, a relieve axle load signal may be delivered to a suspension controller in the event the speed signals indicate the vehicle is (a) traveling at a speed which is no greater than a first speed; and (b) the vehicle is turning at an angle which is at least as sharp as a first angle. The processor may also be responsive to the speed signals and turn signals so as to cause the delivery of a reload axle signal in the event the speed signals indicate that the vehicle is traveling at a second speed which is not less than the first speed and the vehicle is turning at a second angle which is not sharper than the first angle. Again, reloading may occur automatically under other conditions, such as after a time delay from relieving of the load unless a vehicle operator indicates the axle is to remain unloaded.

In response to the relieve axle load signal, the suspension controller causes the rearmost axle suspension system to relieve the load on the rearmost axle. In addition, in response to the axle reload signal, the suspension controller causes the rearmost axle suspension system to increase the load on the rearmost axle. The processor may alternatively deliver the relieve axle load signal and/or the reload axle load signal under other conditions. The processor may also be operable to selectively vary the first speed, the first angle, or both, as well as to vary the second speed and second angle.

In an example in which an air bag suspension system is utilized to relieve and reload the loading on the rearmost axle, the suspension system may include a valve which is controlled in response to the relieve axle load signal to vent the air bag suspension system to relieve air pressure and the load on the rearmost axle. The valve may also be operable to stop the venting of the air bag suspension system for the rearmost axle in response to the reload axle signal to thereby result in increased pressure to the rearmost air bag and suspension system and the reloading of the load on the rearmost axle.

The processor may also be responsive to parking brake status signals to, for example, refrain from delivering the relieve axle load signal and thereby the relieving of the load on the rearmost axle if the parking brake of the vehicle is engaged. In addition, the processor may be responsive to a vehicle operator actuated over-ride signals. For example, the processor may prevent the load from being relieved from the rearmost axle in response to an operator initiated load relief over-ride signal.

The processor may be operable to automatically delivery the relieve axle load signal and the reload axle load signal to the suspension controller under selected conditions. In addition, the processor may be responsive to vehicle operator activated signals to initiate or block loading and relieving of the load on the rearmost axle.

The present invention is directed toward novel and non-obvious aspects of a vehicle load relief system and method, individually, as well as collectively, and to, for example, a vehicle and trailer including such a method and system.

DETAILED DESCRIPTION

Figure 1:
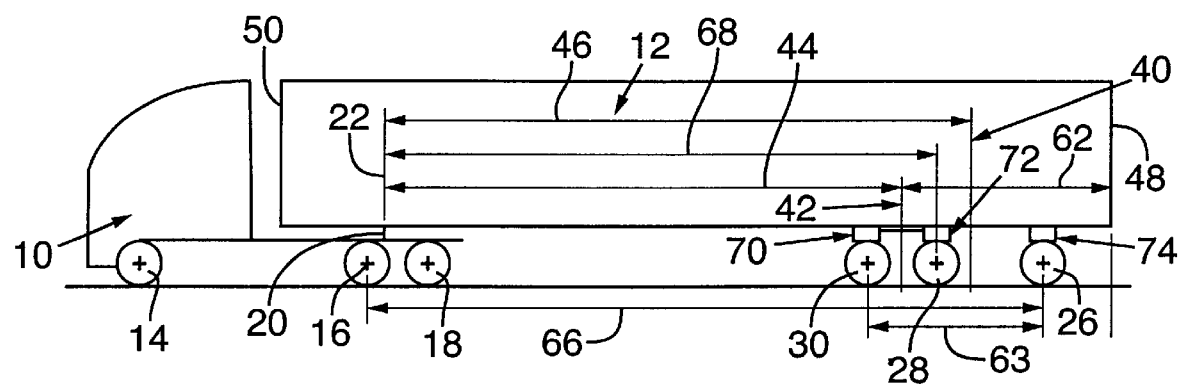
FIG. 1 is a schematic side elevation view of a vehicle and trailer combination having a vehicle rear axle load relief system in accordance with one embodiment of the present invention.

FIG. 1 illustrates a vehicle which, in the specific example shown, comprises a vehicle 10 which is towing a trailer 12. The illustrated vehicle 10 includes a front axle 14 with steerable wheels which are turned, such as using a steering wheel, not shown, to steer the truck. The truck 10 also includes first and second rear axles 16, 18. A trailer support 20 is carried by the vehicle in the region of the rear axles. A king pin on the trailer, such as aligned with the location indicated by line 22, projects downwardly from the trailer and engages the trailer support 20. The trailer pivots relative to the vehicle about the axis of the king pin.

The illustrated trailer 12 has at least two rear axles located toward the rear end portion of the trailer for supporting the rear of the trailer. In the illustrated example, the trailer includes a rearmost axle 26 and two addition rear axles 28, 30 positioned forwardly of rearmost axle 26 and underneath a rear portion of the trailer. In some configurations, only one of the rear axles 28, 30 is provided. With all of the axles 26, 28 and 30 in a load bearing position, the centroid of the support for the rear portion of the trailer is indicated by the vertical line 40. As explained below, in the event the load carried by rear axle 26 is relieved, the effective centroid of the rear axles shifts forwardly, for example, to location 42 in FIG. 1. In this latter case, the effective wheel base of the trailer is indicated by line 44 as the distance between king pin 22 and the centroid 42. In contrast, with rear axle 26 fully loaded, the effective trailer wheel base is indicated by line 46 between king pin location 22 and centroid line 40. Thus, with the load relieved from axle 26, the effective wheel base is shortened in comparison to the case where axle 26 is loaded. That is, the distance from the rear of the trailer indicated at 48 to the centroid increases when the rear axle load is relieved. Consequently, less off-tracking of the trailer occurs when the vehicle 10 turns a corner with the rearmost axle unloaded than in the case when axle 26 is fully loaded and the effective trailer wheel base is longer.

Although variable with the configuration of the particular truck-trailer combinations, in one specific example, the length of the trailer from its front 50 to its rear 48 may be fifty-eight feet. In addition, the overall length of the vehicle-trailer combination may be about sixty-nine feet. In this example, the king pin may be six feet rearwardly of the front 50 of the trailer, and the rearmost axle 26 may be located five feet from the rear 48 of the trailer. Also, in this specific example, the wheel base indicated by line 44 between king pin 22 and centroid 42 may be thirty-eight feet, the axles 26, 30 may be spaced apart eleven feet, as indicated by line 63, and the centroid 42 may be fourteen feet from the rear 48 of the trailer, as indicated by the line 62. Also, the distance between axle 16 and axle 26 may be forty-eight feet, with this distance being indicated by line 66 in FIG. 1. The distance, as indicated by line 68 in FIG. 1, from king pin 22 to axle 28 may be forty feet. Also, the length of the wheel base indicated by line 46 from king pin location 22 to centroid 40 may be forty-two feet. These dimensions may be varied and are simply provided as a specific example. For example, these dimensions may vary if the rearmost axle 26 is combined with only one additional rear axle positioned forwardly thereof.

In the FIG. 1 example, each of the axles 26, 28 and 30 are coupled to the trailer by a respective suspension mechanism 70, 72 and 74. As a specific example, these suspension systems may be conventional air spring or air bag suspensions, such as from Wabash Trailer Company with control modifications such as described in the example below.

Figure 2:
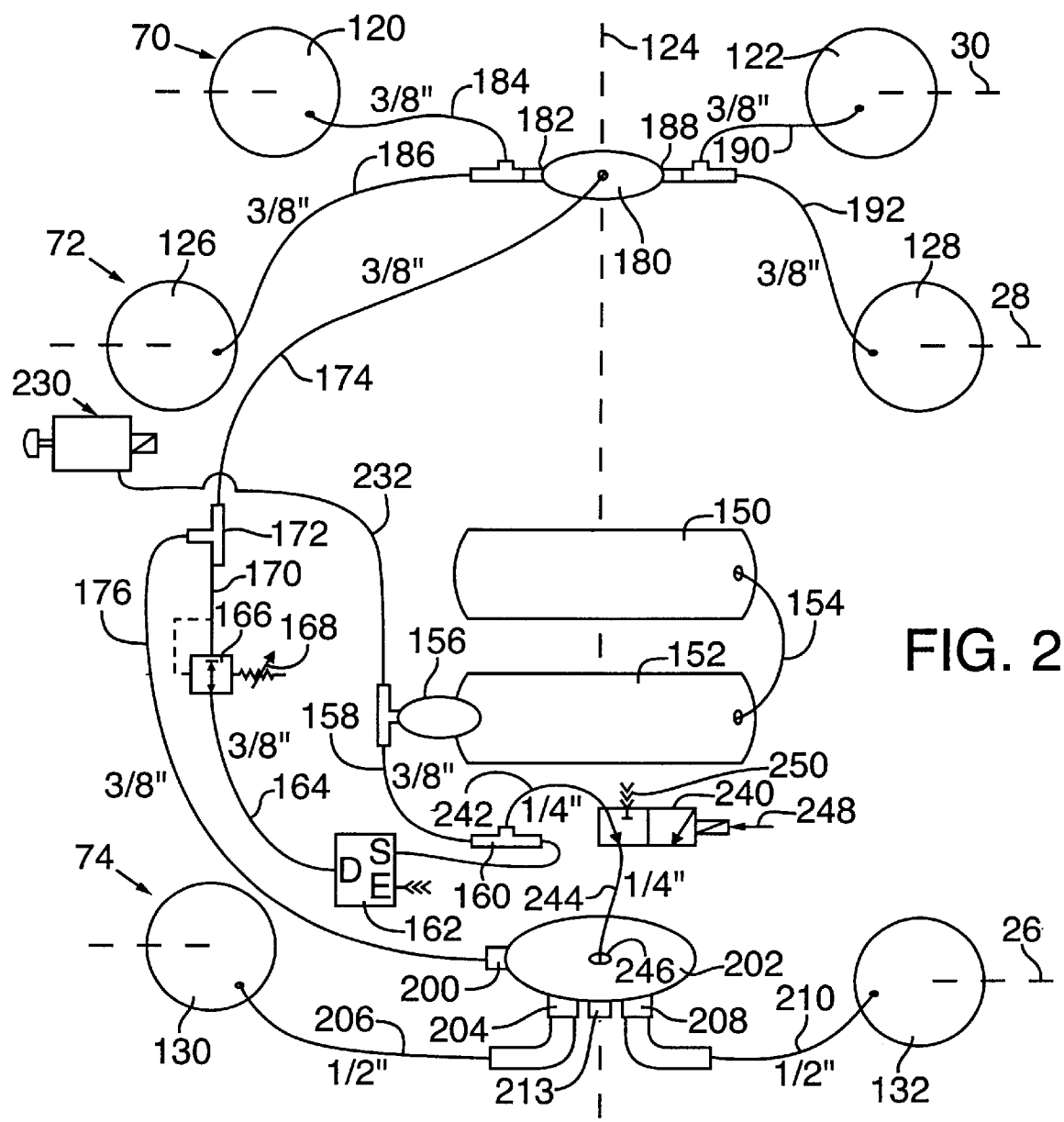
FIG. 2 schematically illustrates a specific embodiment of an air bag suspension system for rear axles of a trailer in which the load on the rearmost axle may be selectively relieved.

With reference to FIG. 2, each of the illustrated suspension mechanisms 70, 72 and 74 includes at least one air bag or air spring which is inflated or deflated to change the height of the trailer. With reference to the example in FIG. 2, the two forward-most rear axles 28, 30 are indicated schematically in this figure by dashed lines. In addition, the rearmost axle 26 is also indicated by a dashed line. Suspension 70 in this example includes first and second air springs or air bags 120, 122 coupled to the axle in a conventional manner, with the air spring 120 being on the opposite side of the longitudinal axis 124 of the vehicle from the air spring 122. Suspension 72 includes first and second air springs 126, 128. In addition, suspension mechanism 74 includes respective air springs or air bags 130, 132, also positioned at opposite sides of the longitudinal center line 124 of the vehicle from one another.

In general, simultaneous inflation of all of the air springs together tends to raise the elevation of the rear portion of the trailer while simultaneous deflation of the air springs tends to lower the elevation of the trailer. In addition, deflation of air springs 130, 132 relative to the air springs 120, 122 and 126, 128 relieves the load carried by the axle 26 with axles 28 and 30 carrying more of the load. This, in effect, shortens and shifts the trailer wheel base forwardly. That is, air springs 130, 132 (or a single air spring, if only one is used for the axle), may be deflated to the point where the rear wheels supported by axle 26 carry little or no load, with the wheels, in essence, scruffing or scraping the pavement. Under these conditions, the trailer path more closely tracks the path following by the truck during a turn, as the effective wheel base of the trailer is reduced. Conversely, reinflation of the air springs 130, 132 (or only one air spring, if only one is being used for axle 26) causes the axle 26 to again be loaded. This lengthens the effective trailer wheel base, for example, when the vehicle is no longer being turned.

As explained below, inflation and deflation of air springs 130, 132 to respectively reload and unload the load on axle 26 may be controlled in response to various conditions, such as the speed at which the vehicle is traveling and whether the vehicle is turning.

In the specific exemplary pneumatic circuit shown in FIG. 2, first and second pressurized air supply tanks 150, 152 are shown interconnected by a conduit 154. Tank 152 has an outlet through a valve 156 which may provide pressure protection for the tanks 150, 152. For example, valve 156 may vent if the pressure in these tanks exceeds a maximum desired magnitude. From valve 156, the air supply is coupled via a conduit 158 and T-connection 160 to a trailer height control valve 162. The valve 162 is conventional and shiftable between supply and exhaust positions to simultaneously cause the inflation and deflation of the air springs 120, 122; 126, 128; and 130, 132, to thereby adjust the height of the trailer. When the valve 162 is in an air supply position, pressurized air passes through valve 162 to a line 164 and through an optional pressure regulator 166. Regulator 166 establishes a maximum pressure of air in this side of the system, and may be varied as indicated by control 168. Pressure regulator 166 is coupled to a line 170 and a T-connection 172 to respective lines 174, 176. Line 174 is connected to a valve 180, such as a QR-1 valve from Allied Signal Company of Elyria, Ohio. An outlet 182 of valve 180 is connected through a first line 184 to air spring 120 and through a second line 186 to the air spring 126. A second outlet 188 of valve 180 is connected through a line 190 to the air spring 122, and through a line 192 to the air spring 128. When pressurized air is being supplied through height control valve 162 to valve 180, the air springs 120, 122 and 126, 128 are simultaneously inflated. Conversely, when valve 162 is shifted to its second position, the line 164 is connected through the valve to an exhaust port E, thereby deflating the air springs 120, 122 and 126, 128. Also, valve 180 may have an exhaust which is opened when pressure is no longer present in line 174.

The line 176 is connected to a supply port 200 of a valve 202 which may, for example, be an R-12 valve produced by Allied Signal Company. An outlet port 204 of valve 202 is connected through a line 206 to the air spring 130. In addition, an outlet port 208 of valve 202 is connected through a line 210 to the air spring 132. With this interconnection approach, pressure in line 176 follows the pressure in line 174. Consequently, unless valve 202 is venting, as described below, air springs 130, 132 are inflated and deflated simultaneously with air springs 120, 122 and 126, 128. As a result, the height of the rear of the trailer may be raised and lowered in this manner.

As is conventional, a control may be provided to adjust the height of the rear portion of the truck from a location adjacent to the rear of the truck. For example, such a control may be used to adjust the elevation of the rear of the trailer to match the elevation of an unloading or loading dock adjacent to the rear end of the trailer. In a specific approach, a manually actuated valve 230 may be provided. Valve 230 is coupled via a line 232 to the line 158. By shifting valve 230 to a vent position, the air springs 120, 122; 126, 128; and 130, 132, are deflated to lower the trailer to the dock level.

In the illustrated pneumatic circuit of FIG. 2, selective inflation and deflation of air springs 130, 132 relative to the other air springs 120, 122, 126, 128 may be accomplished to selectively relieve the load on the rear axle. Although other types of system controllers may be used, in the specifically illustrated pneumatic circuit, a solenoid relay valve 240 is shown. When in its default position, a line 242 from connector 160 is coupled through valve 240 to a control line 244 which is connected to an inlet control port 246 of the valve 202. Under these conditions, an exhaust port 213 through valve 202 is closed so as to not vent lines 206 and 210 through this exhaust port. In contrast, in response to an axle load relieve control signal, such as a 12-volt signal to a control input 248 of the valve 240, the valve 240 is shifted to the left in FIG. 2. This couples the line 244 through the valve to a vent 250. Consequently, the control port 246 of valve 202 is vented. Under these conditions, the lines 206, 210 are coupled to exhaust port 213 by the valve 202 and the air springs 130, 132 are deflated relative to the air springs 120, 122 and 126, 128. Consequently, the load on the axle 26 is relieved. In the illustrated construction, pressurized air is simultaneously being delivered (via valve 162), to lines 164, 170 and 176 to inlet port 200 of the valve although port 200 is closed by the valve 202 from communicating with the exhaust port 213. Thus, the valve 202, in this case, has pressurized air available at its input 200 while venting is taking place.

Figure 3:
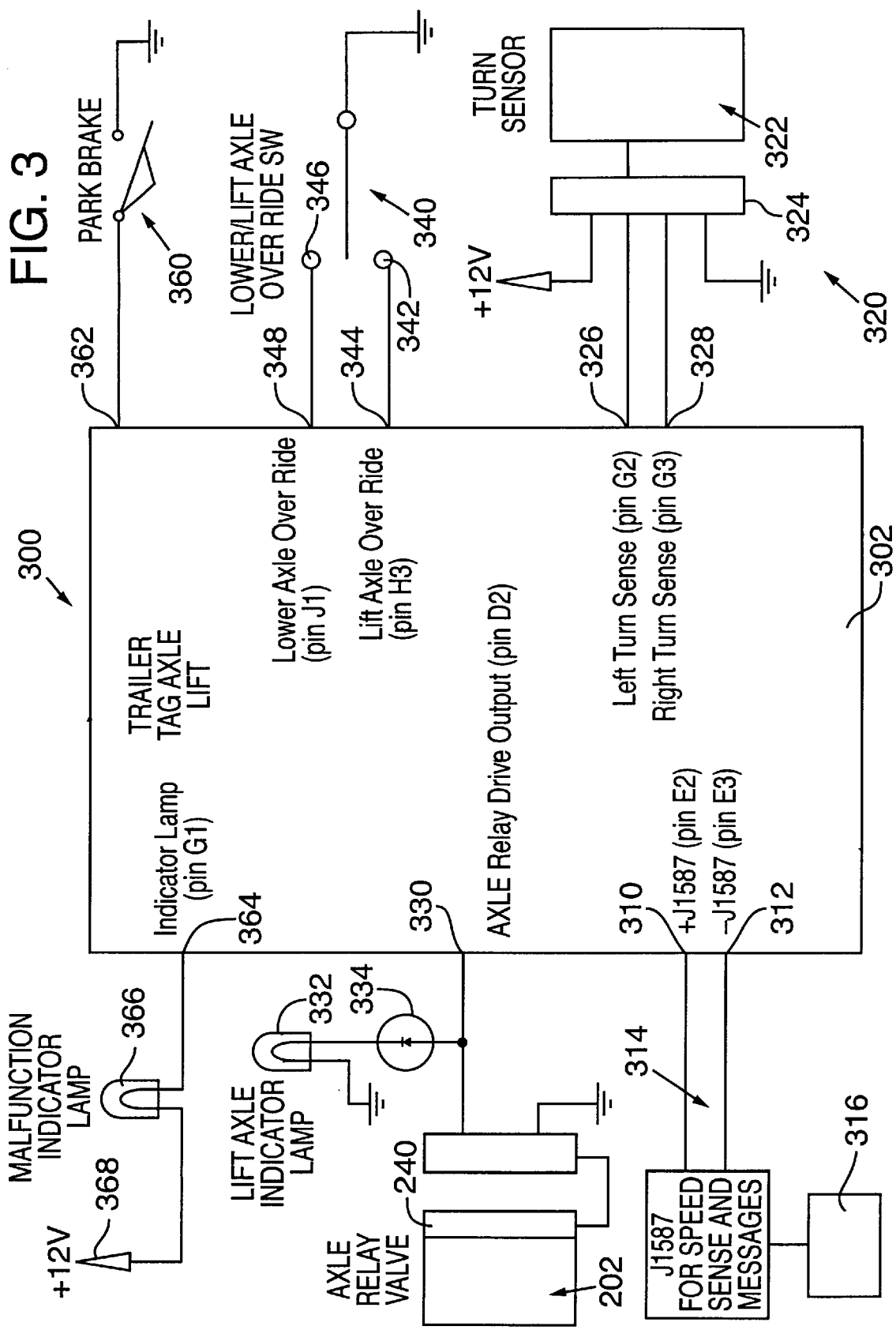
FIG. 3 is a schematic circuit diagram of a specific embodiment of a control circuit which may be utilized in the vehicle rear axle load relief system of FIG. 1.

One suitable control for the above-described system for relieving and reloading the rearmost axle is shown in FIG. 3. The control 300 includes a control circuit 302 which includes a microprocessor and suitable memory, such as flash memory, for storing a program for the microprocessor circuit. The control circuit 302 also includes a number of inputs coupled via suitable drivers to the microprocessor and a number of outputs driven in response to signals from the microprocessor.

Although additional inputs and outputs may be included and some of the inputs and outputs included in FIG. 3 may be deleted, the illustrated control circuit 302 includes first and second vehicle speed inputs 310, 312. These inputs are coupled to a data link 314 on the vehicle, such as an SAE standard J1587 data link. Information may be obtained from the data link concerning various vehicle conditions. For example, the speed at which the vehicle is traveling may be transmitted over the data link to the inputs 310, 312. In FIG. 3, a vehicle speed detector or sensor 316, which may take any convenient form, such as is standard for trucks, may determine the vehicle speed and provide speed information to the data bus for delivery to the microprocessor included in control circuit 302. In addition, various messages may be transmitted to and from the microprocessor of control circuit 302, as desired. As a specific example, the computer program used to control the microprocessor within control circuit 302 may be varied via the data link 314.

The control 300 also includes a vehicle turn detector 320 for determining whether the vehicle is being turned. The control circuit 320 in the illustrated embodiment also indirectly or directly determines the extent to which the vehicle, and, more particularly, the steerable wheels of the vehicle, are being turned. Vehicle turning may be sensed in any convenient manner. For example, the activation of a standard turn signal switch included on the vehicle may be detected to indicate turning, with deactivation of the turn signal switch indicating that turning has ended. Another example is to utilize a turn sensor which detects the extent to which a steering wheel for the vehicle has been turned. As a specific example, a steering sensor assembly, such as an EVT-200 system from Eaton-Vorad Company may be used. In the Eaton-Vorad system, a magnet assembly is coupled to the steering column and movable with the turning of the steering wheel. A pair of Hall effect transistors and related components sense the presence of a magnetic field. The magnet is positioned to expose both of the Hall effect transistors to an equal strength field when the vehicle is moving straight ahead. Thus, a no-turn condition is detected. When the steering wheel is turned, the magnet swings away from the two Hall effect transistors, one at a time, signaling both the turn and turn direction. With this input, the Eaton-Vorad turn sensor is able to count the number and direction of steering wheel turns and thus the extent to which the vehicle is being turned.

Another exemplary turn sensor usable in the system is a model 85 position encoder with analog output available from Horner Company of Canada, which may be modified to operate in the following manner. In a standard operation, the Model 85 turn sensor includes an encoder mounted on a vehicle steering column and operable to detect the extent to which the steering column has been turned. In one form, this turn sensor produces an analog voltage output which varies depending upon the position of the steering wheel, e.g., to correspond to positions through four revolutions of the steering wheel (zero to seven hundred-twenty degrees). The Model 85 turn sensor may be modified to provide an analog output which varies from one to five volts over a range of steering wheel turning from zero degrees to ninety degrees in each direction. The output voltage corresponds to the extent to which the steering wheel has turned within this range, with this range being variable. The vehicle may be deemed to be traveling at a second predetermined angle if the steering wheel has been turned less than a given amount. For example, the vehicle may be deemed to be traveling in a substantially straight line if the steering wheel has been turned in either direction no more than from zero to fifteen degrees, although this may be varied. In addition, if the steering wheel has turned a further amount, such as corresponding to at least five degrees of turning of the steerable front wheels of the vehicle, the processor may determine from the analog input signals that the vehicle is now turning at least at a first predetermined angle. Thus, vehicle turning at a first predetermined angle may be deemed to have occurred if the steering wheel has turned through ninety degrees or, to some extent less than ninety degrees. The gap between fifteen degrees and ninety degrees of steering wheel turn, or over a different range, may be considered to be the difference between a second predetermined angle and a first predetermined angle of vehicle steering.

Thus, for example, assume the vehicle is traveling at less than a first speed, such as a speed which is in the range of from ten to fifteen miles per hour, and a sharp turn is detected (e.g., the steering wheel has turned ninety degrees, or some lesser amount). Under these conditions, the load on the rearmost axle may be relieved. Thereafter, when the speed of the vehicle increases to a second speed, for example, to some speed in excess of twenty-five miles per hour, and the angle of the turn is no more than the turn achieved with the steering wheel is turned through fifteen degrees, or some other value corresponding to a second predetermined angle, reloading of the load on the rearmost axle may occur. Also, reloading of the axle may take place under other conditions, for example, after a period of time, for example, thirty seconds, has elapsed following the relieving of the load. An operate over-ride may maintain the load on the rearmost axle in a relieved state beyond this delay time period.

Again, the system is not limited to any particular approach for determining the turning of the vehicle. More direct determinations may, for example, be made from directly sensing the position of the steerable wheels.

In FIG. 3, a turn sensor is indicated generally at 322. The output from turn detector or sensor 322 is fed to a signal conditioning circuit 324 which provides signals to respective inputs 326, 328 of control circuit 302. Input 326 is a left-turn sense input. From signals at this input 326, the control circuit 302 can determine that the vehicle is turning to the left and the extent to which vehicle turning is occurring. Input 328 is a right-turn sense input. The circuit 302 can determine the extent to which the vehicle is turning to the right from the signals at the input 328.

Output 330 of control circuit 302 controls the operation of solenoid controlled relay 240 (FIG.) and thereby the valve 202 resulting in the selective relieving of the load on the rearmost axle or reloading of the rearmost axle, depending upon the output at 330. When suitable conditions are determined by control 300 to indicate that the load on the rear axle should be relieved, a rear axle load relieve signal is delivered at output 330. In this specific example, this rear axle load relieve signal may constitute a 12-volt voltage signal. When this signal appears at output 330, a lamp 332 coupled to output 330 through an optional diode 334 may be energized to provide a visual indication, such as within the cab of the vehicle, that the system has been operated to lift or relieve load from the rearmost axle of the trailer. Conversely, when this 12-volt signal is absent from pin 330, corresponding to a reload axle signal at this output, the relay 240 and valve 202 are operated to return the rearmost axle to a loaded condition.

Control 300 may automatically operate to relieve and reload the axle in response to input conditions determined by the control circuit. However, semi-automatic operation may be implemented. For example, a switch, such as a manually actuated switch, may be provided and required to be in a specific operating position in order for the load relief system to cause the load on the rearmost axle to be relieved.

In the specific example, shown in FIG. 3, a three-position switch 340 is provided. The illustrated switch 340 is manually operated. In the central or neutral position shown in FIG. 3, the switch is disconnected from the control circuit 302 and nodes 342, 346 are open. If switch 340 is set to a lift axle over-ride position, that is, switch 340 is connected to node 342 and thus to an input 344 to the control circuit 302, input 344 is grounded. This corresponds to an operator indicated lift axle over-ride setting. When switch 340 is in this position, and subject to other conditions which may be required, the system may be blocked from relieving the load on the rearmost axle. Alternatively, switch 340 may be shifted to engage a node 346 coupled to a lower axle over-ride input 348 of the control circuit 302. When in this position, input 348 to circuit 302 is grounded. When switch 340 is in this lower axle over-ride position, and assuming other conditions such as described below are met, the system blocks the reloading of the axle.

As an additional input to the control circuit 302, a parking brake condition indicating switch 360 may be monitored to determine whether the parking brake is engaged or released. When the parking brake in this example is engaged, switch 360 is closed and a parking brake status input 362 of control circuit 302 is coupled to ground. Signals at input 362 thus comprise one form of parking brake status signals. As a specific example, if this input 362 is included in circuit 302, the system may be operated to prevent relieving of the load on the rearmost axle when, for example, the parking brake is in an engaged or set state.

An optional output 364 of circuit 302 is coupled through a malfunction indicator lamp 366 to a voltage source 368. Input 364 may be grounded to cause lamp 366 to light up and provide a visual warning signal, for example, inside the cab of a vehicle, if certain conditions are encountered. An auditory warning may also be provided. For example, if the vehicle is traveling at above a certain speed for more than a predetermined period of time and the control circuit is sensing either a left-turn or right-turn, an indication of a malfunction in the turn sensor may be indicated.

Figure 4:
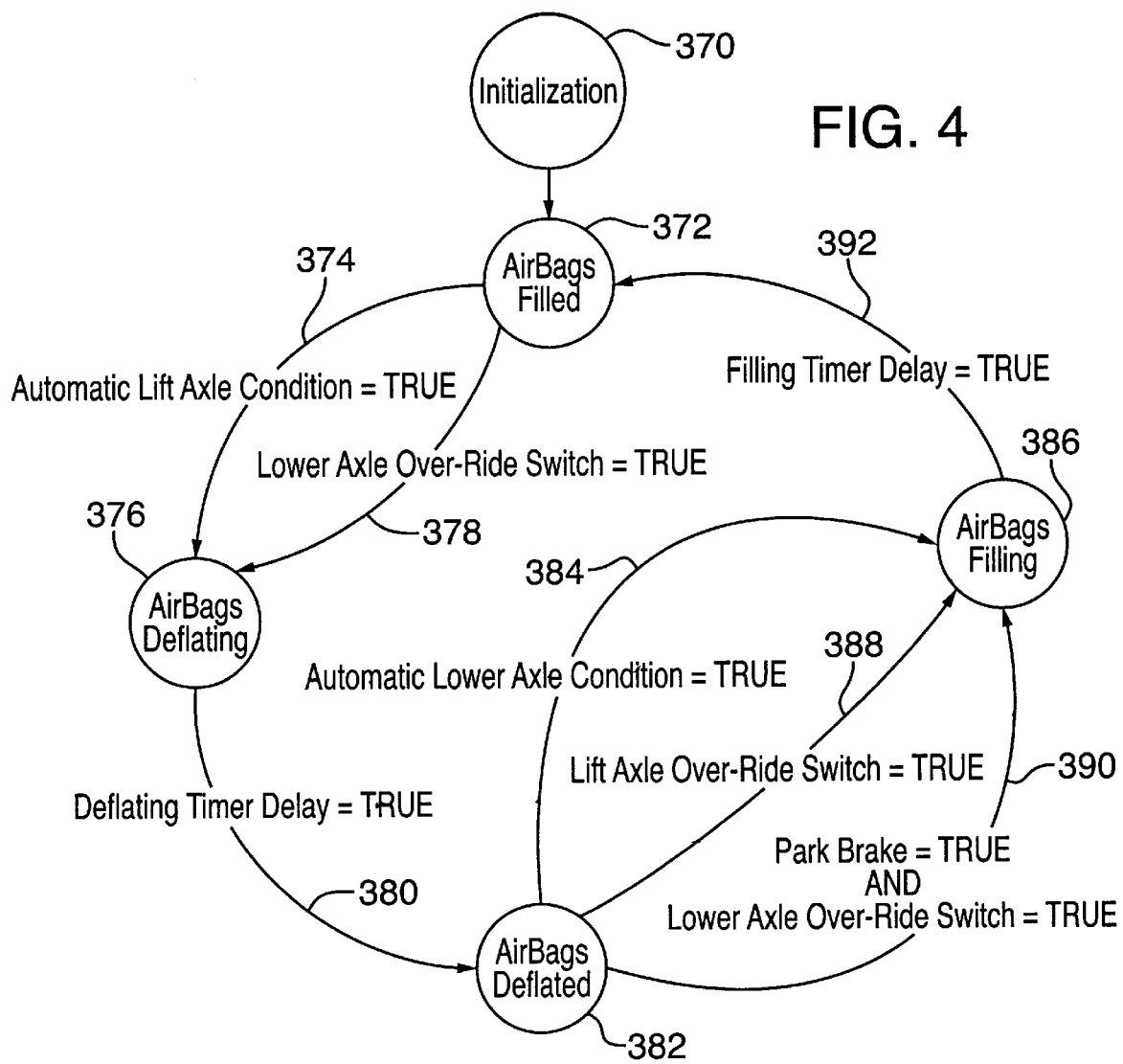
FIG. 4 is a state diagram providing an example of programming for a microprocessor included in the control circuit of FIG. 3.

FIG. 4 illustrates one specific state diagram for programming the microprocessor included in circuit 302. This program may be modified to detect additional inputs to the FIG. 3 control. For example, an ignition switch input may be provided with the system deactivated from relieving the load on the rearmost axle if the ignition switch is off. Alternatively, the load may be relieved even when the ignition switch is off if a manual over-ride is activated. It should be also noted that the FIG. 3 circuit may be implemented in a hard-wired circuit, although a programmable device is more easily modified to, for example, vary conditions and parameters which are to be met in order for the system to relieve or to reload the rearmost axle.

With reference to FIG. 4, the system is initialized at state 370 and then shifted to state 372. In state 372, an AirBags Filled state, the air bags of the suspensions 70, 72 and 74 are filled a desired amount for vehicle operation. For example, they are filled to support the trailer at a desired height. From state 372, assuming the case of an automatically operating system, a branch 374 is followed to an AirBags Deflating state 376 in the event conditions established by the automatic lift axle condition branch 374 are true or met (other conditions may also be required to be met, such as discussed below). In one embodiment, the automatic lift axle condition is true if the speed of the vehicle is no greater than a first speed and the vehicle is turning at least at a first angle. The first speed and first angle in this example may be software program variables and thus may be selectively varied. As a specific example, the first speed may in one case be predetermined to be a speed in the range of from ten to fifteen miles per hour. Again, this first predetermined speed may be varied. In addition, the first angle may be at least a five degree turn, although a sharper or wider turn may be predetermined and established as the first angle. As another automatic lift axle condition, assuming the parking brake setting is being monitored as part of the system, a requirement can be imposed that the parking brake not be set in order for the automatic lift axle condition to be true. If the conditions imposed along branch 374 are true, and other conditions such as explained below are not being imposed, the air bags included in the rearmost suspension (e.g., air springs 130, 132 in FIG. 2) may be deflated to relieve the load from the rearmost axle.

If a lower axle over-ride switch (e.g., switch 340, node 342, and input 344 in circuit 302) is included, the system may require that the conditions of branch 378 also be true before air bags deflate at state 376. More specifically, the lower axle over-ride switch condition may be deemed true or met if the switch 340 is not set to node 342. Switch 340 would be set by the vehicle operator to indicate that lifting of the axle (load relief on the rearmost axle) is not desired. The term "vehicle operator" in this disclosure includes anyone who is operating the load relief system.

From state 376, a branch 380 may be followed to an AirBags Deflated state 382. Branch 380 corresponds to a delay in this specific example to allow for the rearmost air bags to deflate. For example, a one second delay may be implemented. Following this delay (assuming the delay is included in the system), the air bags of the rearmost axle are deemed deflated at state 382. From state 382, a branch 384 is followed to an AirBags Filling state 386 corresponding to reloading the load on the rearmost axle. State 386 is reached, assuming the automatic lower axle conditions of branch 384 are true or met (additional or alternative conditions may also be imposed, such as along branches 388 and 390, and as explained below). Again, the branch 384 assumes an automatically operating system is being used. The conditions of branch 384 are met if the vehicle speed has increased to at least a second speed which is preferably greater than the first speed. For example, although variable by programming in this specific implementation, the second speed may be predetermined to be greater than or equal to twenty-five miles per hour. As another condition of branch 384, a requirement may be imposed that the vehicle is also turning at a second angle which is preferably less than the first angle. For example, a requirement can be imposed that the vehicle be traveling at a second angle corresponding to the vehicle traveling substantially in a straight line for this condition of branch 384 to be met.

In branch 384, a time condition can be imposed. For example, the conditions of branch 384 may not be deemed true or met until the vehicle speed is determined to be at least at the second speed for a predetermined period of time, which may be varied. As a specific example, a predetermined time of thirty seconds may be imposed.

The condition of branch 388 may also be required to be met before state 386 is reached from state 382. This branch corresponds to the lift axle over-ride switch being true or not set. In the specific implementation of FIG. 3, the lift axle over-ride switch is set if switch 340 is coupled to node 346. In such a case, the operator has indicated that he or she does not wish the load on the rear axle to be reestablished. This switch may be eliminated or its operation limited to minimize the possibility of a vehicle traveling for any extended time without the rearmost axle being loaded. Alternatively, state 386 may be automatically reached from state 382 following a time period, which may be varied and with thirty seconds being a specific example, after the load on the rearmost axle is relieved. The over-ride may be operable to allow the operator to maintain the rearmost axle in an unloaded condition, for example, for an additional period of time, following the expiration of this delay.

Also, one or both of the conditions of branch 390 (if this branch is included) may be required to be met before state 386 is reached from state 382. Branch 390 may impose the requirement that the parking brake be true (not engaged). The other condition which may be imposed by this branch is that the lower axle over-ride switch is true. That is, that the lower axle over-ride switch is not set.

At state 386, the air bags for the rearmost axle 130, 132 commence inflating. Under these conditions, the rear axle is again reloaded. State 376, the AirBag Filled state is again reached from state 386 along a branch 392. Branch 392 may impose a delay, for example, one second, following which time the air bags are deemed filled.

It will be appreciated that the programming may be varied from the specific example described above.

Figure 5:
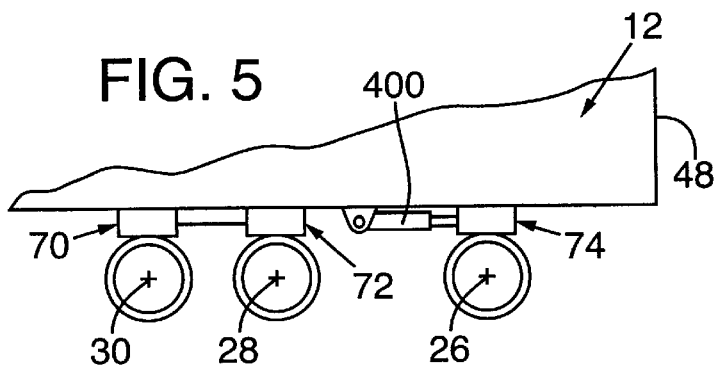
FIG. 5 illustrates an embodiment of a vehicle rear axle load relief system utilizing a fluid cylinder mechanism for raising and lowering the rearmost axle of a vehicle trailer.

FIG. 5 illustrates an alternative construction. In this construction, the rearmost axle 26 is pivoted to the trailer 12. In addition, a fluid cylinder, such as a hydraulic cylinder 400, is extended and retracted to respectively 115 lower and raise the axle 26. The cylinder 400 may be operated to move the axle sufficiently to raise the rearmost wheels totally off the pavement or a lesser amount, for example, with rearmost wheels simply resting lightly on the pavement where they would scruff or scrape the pavement when the trailer is turned. In either case, the effective wheel base of the trailer being shifted forwardly in comparison to the case where the rear axle 26 is fully loaded. The operation of the cylinder 400 may, for example, be controlled in the same manner as explained above. For example, a load axle relieve signal and a reload axle signal may be provided to a hydraulic circuit to control cylinder 400 to lift and lower the wheels in response to vehicle speed, turning, and to other conditions such as previously described.

Having illustrated and described the principles of our invention with reference to several preferred embodiments, it should be apparent to those of ordinary skill in the art that the invention may be modified in arrangement and detail without departing from such principles. We claim as our invention all such modifications as come within the scope of the following claims:

What is claimed is:

1. A method of operating a vehicle and trailer, the trailer having at least two rear wheel supporting axles, one of said at least two rear wheel supporting axles comprising a rearmost axle, the method comprising:
   determining the speed of the vehicle;
   determining whether the vehicle is turning;
   relieving the load on the rearmost axle when the vehicle is moving and when the speed of the vehicle is determined to be no greater than a first speed and the vehicle is determined to be turning at least at a first angle.

2. A method according to claim 1 including the step of selectively varying the first speed.

3. A method according to claim 2 including the step of selectively varying the first angle.

4. A method according to claim 1 in which the step of relieving the load comprises the step of elevating the rearmost axle to lift the wheels supported by the rearmost axle.

5. A method of operating a vehicle and trailer, the trailer having at least two rear wheel supporting axles, one of said at least two rear wheel supporting axles comprising a rearmost axle, the method comprising:
   determining the speed of the vehicle;
   determining whether the vehicle is turning;
   relieving the load on the rearmost axle when the speed of the vehicle is determined to be no greater than a first speed and the vehicle is determined to be turning at least at a first angle; and
   in which the step of relieving the load comprises the step of relieving air pressure from an air bag suspension system coupled to the rearmost axle to thereby relieve the load from the rearmost axle.

6. A method of operating a vehicle and trailer, the trailer having at least two rear wheel supporting axles, one of said at least two rear wheel supporting axles comprising a rearmost axle, the method comprising:
   determining the speed of the vehicle;
   determining whether the vehicle is turning;
   relieving the load on the rearmost axle when the speed of the vehicle is determined to be no greater than a first speed and the vehicle is determined to be turning at least at a first angle; and
   including the step of subsequently increasing the load on the rearmost axle when the speed of the vehicle is determined to be at least at a second speed which is greater than the first predetermined speed and the vehicle is determined to be turning at a second angle which is less than the first angle.

7. A method according to claim 6 in which the second predetermined angle corresponds to the vehicle driving in a substantially straight line.

8. A method according to claim 7 in which the first predetermined speed is between ten and fifteen miles per hour, and the second predetermined speed is at least twenty-five miles per hour.

9. A method according to claim 6 including the step of delaying the step of increasing the load on the rearmost axle until the speed of the vehicle is determined to be at least at the second predetermined speed for a predetermined period of time.

10. A method according to claim 6 including the step of substantially increasing the load on the rearmost axle after the load on the rearmost axle has been relieved for a predetermined period of time.

11. A method of operating a vehicle and trailer, the trailer having at least two rear wheel supporting axles, one of said at least two rear wheel supporting axles comprising a rearmost axle, the method comprising:
   determining the speed of the vehicle;
   determining whether the vehicle is turning;
   relieving the load on the rearmost axle when the speed of the vehicle is determined to be no greater than a first speed and the vehicle is determined to be turning at least at a first angle; and
   including the step of subsequently increasing the load on the rearmost axle after the load on the rearmost axle has been relieved for a predetermined period of time in the absence of a vehicle operator activated over-ride which delays the step of increasing the load on the rearmost axle beyond the predetermined period of time.

12. A method of operating a vehicle and trailer, the trailer having at least two rear wheel supporting axles, one of said at least two rear wheel supporting axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle;

in which the step of relieving the load comprises the step of venting an air bag suspension system coupled to the rearmost axle; and the method further including the step of selectively ceasing the venting of the air bag suspension system coupled to the rearmost axle to reload the rearmost axle.

13. A method of operating a vehicle and trailer, the trailer having at least two rear wheel supporting axles, one of said at least two rear wheel supporting, axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle; and in which the first predetermined speed is no more than about fifteen miles per hour and the first predetermined angle is no more than about five degrees.

14. A method of operating a vehicle and trailer, the trailer having at least two rear wheel supporting axles, one of said at least two rear wheel supporting axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle; and including the step of detecting whether a parking brake for the vehicle is engaged and preventing the relieving of the load on the rear axle if the parking brake is engaged.

15. A method of operating a vehicle and trailer, the trailer having at least two rear wheel supporting axles, one of said at least two rear wheel supporting axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle; and in which the step of relieving the load comprises the step of automatically relieving the load on the rearmost able when the speed of the vehicle is determined to be no greater than a first speed and the vehicle is determined to be turning at least at a first angle.

16. A method of operating a vehicle and trailer, the trailer having at least two rear wheel supporting axles, one of said at least two rear wheel supporting axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle;

including the step of detecting whether a vehicle operator actuated over-ride is activated; and including the step of detecting whether a parking brake for the vehicle is engaged, and in which the step of relieving the load comprises the step of automatically relieving the load on the rearmost axle when the speed of the vehicle is determined to be no greater than a first speed and the vehicle is determined to be turning at least at a first axle unless the parking brake of the vehicle is engaged or the over-ride is activated.

17. A method of operating a vehicle and trailer, the trailer having at least two rear wheel supporting axles, one of said at least two rear wheel supporting axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle;

including the step of detecting whether a vehicle operator actuated over-ride is activated; and in which the step of relieving the load comprises the step of automatically relieving the load on the rearmost axle when the speed of the vehicle is determined to be no greater than a first speed and the vehicle is determined to be turning at least at a first angle unless the over-ride is activated.

18. A method of operating a vehicle and trailer, the trailer having at least two rear wheel supporting axles, one of said at least two rear wheel supporting axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle;

including the step or detecting whether a parking brake for the vehicle is engaged; and in which the step of relieving the load comprises the step of automatically relieving the load on the rearmost axle when the speed of the vehicle is determined to be no greater than a first speed and the vehicle is determined to be turning at least at a first angle unless the parking brake of the vehicle is engaged.

19. A method of operating a vehicle and trailer, the trailer having at least two rear wheel supporting axles, one of said at least two rear wheel supporting axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle; and including the step of relieving the load in response to a vehicle operator actuated instruction to relieve the load if the parking brake is not engaged and the vehicle is traveling at a speed which is no greater than the first speed regardless or whether the vehicle is determined to be turning.

20. A method of operating a vehicle and trailer, the trailer having at least two rear axles, one of said at least two rear axles comprising a rearmost axle, the method comprising:

determining the speed of the vehicle;

determining whether the vehicle is turning;

relieving the load on the rearmost axle when the speed of the vehicle is determined to be no greater than a first speed and the vehicle is determined to be turning at least at a first angle;

in which the step of relieving the load comprises the step of relieving pressure from an air bag suspension system coupled to the rearmost axle to thereby relieve the load from the rearmost axle;

increasing the load on the rearmost axle when (a) the speed of the vehicle is determined to be at least at a second speed for a predetermined time, the second speed being greater than the first speed, and providing the vehicle is determined to be turning at a second angle which is less than the first angle, or (b) upon the lapsing of a delay time following the relieving of the load on the rearmost axle;

wherein the step of relieving the load comprises the step of venting an air bag suspension system coupled to the rearmost axle; and wherein the step of increasing the load comprises the step of ceasing venting of the air bag suspension system when the speed of the vehicle is determined to be at least at the second predetermined speed for the predetermined time, and the vehicle is turning at a second predetermined angle which is less than the first predetermined angle.

21. A method according to claim 20 including the step of delaying the occurrence of the step of increasing the load on the rearmost axle in the event a vehicle operator over-ride is activated.

22. A method according to claim 20 including the step of detecting whether a parking brake for the vehicle is engaged and whether a vehicle operator actuated over-ride is activated, wherein the step of relieving the load comprises the step of automatically relieving the load on the rearmost axle when the vehicle speed is no greater than a first speed and the vehicle is turning at least at the first vehicle angle unless the parking brake of the vehicle is engaged or the over-ride is activated; the method also including the step of relieving the load in response to a vehicle operator actuated instruction to relieve the load if the parking brake is not engaged and the vehicle is traveling at a speed which is no greater than the first speed regardless of whether the vehicle is determined to be turning.

23. A method of operating a vehicle and trailer, the trailer having a front portion and a rear portion, the method comprising:

moving a vehicle along a roadway;

selectively shifting the location at which the rear portion of the trailer is supported forwardly while the vehicle is moving; and wherein the step of selectively shifting the location comprises the step of shifting the location forwardly while the vehicle is traveling at no more than a first speed and the vehicle is determined to be tuning at least at a first angle.

24. A vehicle and trailer comprising:

a trailer body and at least two rear axles supporting the body, one of said at least two rear axles comprising a rearmost axle;

a rearmost axle suspension system coupling the rearmost axle to the trailer;

a speed sensor operable to determine the speed at which the vehicle is traveling;

a vehicle turn detector operable to determine whether the vehicle is turning;

a processor coupled to the speed sensor and to the turn detector so as to receive speed signals corresponding to the speed of the vehicle and turn signals corresponding to the turning of the vehicle;

a suspension controller coupled to the rearmost axle, the suspension controller being responsive to a relieve axle load signal to cause the load on the rearmost axle to be relieved and being responsive to an axle reload signal to cause the load on the rearmost axle to increase;

the processor being coupled to the suspension controller to cause the delivery of the relieve axle load signal and axle reload signal to the suspension controller;

the processor being responsive to the speed signals and turn signals so as to selectively cause the delivery of the relieve axle load signal to the suspension controller in the event the speed signals indicate the vehicle is traveling at a speed which is no greater than a first speed and the vehicle is turning at an angle which is at least as sharp as a first angle, thereby resulting in a reduction in the load on the rearmost axle, the processor also being responsive to the speed signals and turn signals so as to cause the delivery of a reload axle signal in the event (a) the speed signals indicate that the vehicle is traveling at a second speed which is not less than the first speed and the vehicle is turning at a second angle which is not sharper than the first angle, or (b) after a period of time from the relieving of the load on the rearmost axle, thereby resulting in the reloading of the rearmost axle.

25. A vehicle and trailer according to claim 24 in which the first and second speeds are predetermined, the first and second angles are predetermined, and wherein the second predetermined speed is greater than the first predetermined speed and the second predetermined angle is less sharp than the first predetermined angle.

26. A vehicle and trailer according to claim 25 in which the second predetermined angle corresponds to the vehicle traveling in substantially a straight line.

27. A vehicle and trailer according to claim 26 in which the first predetermined speed is no greater than about fifteen miles per hour, the second predetermined speed is at least about twenty-five miles per hour, and the first predetermined angle is at least about five degrees.

28. A vehicle and trailer according to claim 24 in which the processor is operable to delay the delivery of the reload axle signal in response to a vehicle operator activated over-ride.

29. A vehicle and trailer according to claim 24 in which the processor is programmable to selectively vary first the first and speeds and to vary the first and second angles.

30. A vehicle and trailer according to claim 24 in which the rearmost axle suspension system comprises at least one lift cylinder operable to raise the rearmost axle in response to the relieve axle load signal to thereby relieve the load on the rearmost axle and to lower the rearmost axle in response to the reload axle signal to thereby reload the load on the rearmost axle.

31. A vehicle and trailer according to claim 24 in which the rearmost axle suspension system comprises an air bag suspension system coupled to the rearmost axle, said air bag suspension system being operable in response to the relieve axle load signal to relieve the load from the rearmost axle, the air bag suspension system being operable in response to the reload axle signal to reload the rearmost axle.

32. A vehicle and trailer according to claim 24 in which the vehicle includes a parking brake, a parking brake sensor operable to determine whether the parking brake is engaged to apply a braking force, the parking brake sensor providing a parking brake status signal indicating whether the parking brake is engaged, the processor being responsive to the parking brake status signal and operable to block the delivery of the relieve axle load signal and thereby the relieving of the load on the rearmost axle if the parking brake status signal indicates that the parking brake is engaged.

33. A vehicle and trailer according to claim 32 including a vehicle operator actuated over-ride coupled to the processor and operable to deliver a load relief over-ride signal to the processor, the processor being responsive to the vehicle operator actuated load relief over-ride signal to prevent the delivery of the relieve axle load signal in response to the vehicle operator actuated load relief over-ride signal.

34. A vehicle and trailer according to claim 33 including a vehicle operator actuated over-ride coupled to the processor and operable to deliver a load relief over-ride signal to the processor, the processor being responsive to the vehicle operator actuated load relief over-ride signal to prevent the delivery of the relieve load axle signal in response to the vehicle operator actuated load relief over-ride signal.

35. A vehicle and trailer according to claim 34 in which the processor is operable to automatically deliver the relieve axle load signal to the suspension controller if (a) the speed signals indicate the vehicle is traveling at a speed which is greater than the first predetermined speed, (b) the vehicle is turning at an angle which is at least as sharp as the first predetermined angle, (c) the parking brake is not engaged, and (d) the vehicle operator actuated over-ride is not actuated to deliver the vehicle operator actuated load relief over-ride signal to the processor.

36. A vehicle and trailer according to claim 35 including a vehicle operator activated actuator which is operable to deliver a vehicle operator actuated relieve load signal to the processor, the processor being responsive to the vehicle operator actuated relieve load signal to deliver the relieve axle load signal to the suspension controller and to relieve the load from the rearmost axle in response to the vehicle operator actuated relieve load signal in the event the parking brake is not engaged and the vehicle is traveling at less than the predetermined first speed, and regardless of whether the vehicle is turning.

37. A vehicle and trailer according to claim 24 which includes a vehicle operator controlled actuator which is operable to generate a vehicle operator actuated relieve load signal, the processor being responsive to the vehicle operator actuated relieve load signal to deliver the relieve axle load signal to cause the relieving of the load from the rearmost axle when the vehicle is traveling at a speed which is no greater than the first predetermined speed and is turning at an axle which is at least as sharp as the first predetermined angle, thereby providing semi-automatic load relief.

38. A vehicle and trailer according to claim 37 in which the vehicle includes a parking brake, a parking brake sensor operable to determine whether the parking brake is engaged to apply a braking force, the parking brake sensor providing a parking brake status signal indicating whether the parking brake is engaged, the processor being responsive to the parking brake status signal and operable to prevent the delivery of the relieve axle load signal and thereby the relieving of the load on the rearmost axle if the parking brake is engaged.

39. A vehicle and trailer comprising:

a trailer having a body and at least two rear axles supporting the body, one of said at least two rear axles comprising a rearmost axle;

rearmost axle suspension means for coupling the rearmost axle to the trailer;

a speed sensor operable to determine the speed at which the vehicle is traveling;

a vehicle turn detector operable to determine whether the vehicle is turning;

processor means for coupling to the speed sensor and to the turn detector so as to receive speed signals corresponding to the speed of travel of the vehicle and turn signals corresponding to the turning of the vehicle;

suspension controller means coupled to the rearmost axle suspension means and to the processor means, the suspension controller means comprising means for relieving the load on the rearmost axle in response to a relieve axle load signal and for increasing the load on the rearmost axle in response to a reload axle signal;

the processor means comprising means for selectively delivering the relieve axle load signal and reload axle signal to the suspension controller means, the processor means comprising means responsive to the speed signals and turn signals for selectively delivering the relieve load axle signal to the suspension controller in the event the speed signals indicate the vehicle is traveling at a speed which is no greater than a first speed and the vehicle is turning at an axle which is at least as sharp as a first angle, thereby resulting in a reduction in the load on the rearmost axle, the processor means also comprising means for delivering the reload axle signal after a period of time following the delivery of the relieve load axle signal, thereby resulting in the reloading of the rearmost axle.

40. A vehicle and trailer according to claim 39 including an operator over-ride operable to selectively cause the processor means not to delivery the relieve axle and reload axle signals to the suspension controller means.

* * * * *

UNITED STATES PATENT AND TRADEMARK OFFICE
CERTIFICATE OF CORRECTION

PATENT NO. : 6,240,339 B1
DATED : May 29, 2001
INVENTOR(S) : Mayenburg et al.

Page 1 of 1

It is certified that error appears in the above-identified patent and that said Letters Patent is hereby corrected as shown below:

<u>Column 11,</u>
Line 34, delete the number "115".

<u>Column 13,</u>
Line 62, change "able" to -- axle --

<u>Column 15,</u>
Line 5, change "or" to -- of --

Signed and Sealed this

Twenty-third Day of April, 2002

Attest:

Attesting Officer

JAMES E. ROGAN
*Director of the United States Patent and Trademark Office*